US006214489B1

(12) United States Patent
Stocchiero

(10) Patent No.: US 6,214,489 B1
(45) Date of Patent: Apr. 10, 2001

(54) METHOD AND APPARATUS TO OBTAIN THE AGITATION OF ELECTROLYTE INSIDE A LEAD-ACID STORAGE BATTERY

(76) Inventor: Olimpio Stocchiero, Via Kennedy, 5, 36050 Montorso Vicentino (IT)

(*) Notice: Subject to any disclaimer, the term of this patent is extended or adjusted under 35 U.S.C. 154(b) by 0 days.

(21) Appl. No.: 09/171,658

(22) PCT Filed: Apr. 11, 1997

(86) PCT No.: PCT/EP97/01825

§ 371 Date: Oct. 23, 1998

§ 102(e) Date: Oct. 23, 1998

(87) PCT Pub. No.: WO97/41609

PCT Pub. Date: Nov. 6, 1997

(30) Foreign Application Priority Data

Apr. 26, 1996 (IT) ............................................ VI96A0069

(51) Int. Cl.$^{7}$ ................................................ H01M 2/38

(52) U.S. Cl. ................................ 429/51; 429/70; 429/95

(58) Field of Search ................................ 429/95, 51, 70, 429/73, 80

(56) References Cited

U.S. PATENT DOCUMENTS 842,389 * 1/1907 Decker ................................ 429/95 X
3,083,253 * 3/1963 Sundberg ................................ 429/51
4,269,906 5/1981 Schmechtig .
4,288,501 9/1981 Moody .
4,520,080 * 5/1985 Hashimoto ......................... 429/70 X
5,340,667 * 8/1994 Stinson et al. ..................... 429/95 X

FOREIGN PATENT DOCUMENTS 877555 12/1942 (FR) .
57-115760 7/1982 (JP) .
57-208063 12/1982 (JP) .
57-210564 12/1982 (JP) .
62-029060 2/1987 (JP) .
62-122058 6/1987 (JP) .

* cited by examiner

*Primary Examiner*—John S. Maples
(74) *Attorney, Agent, or Firm*—Dykema Gossett PLLC

(57) ABSTRACT

The invention concerns a method to obtain the agitation of the electrolyte inside a lead-acid storage battery comprising at least one canalization duct (4) of electrolyte which is immersed inside the storage battery. Said method consists in: connecting said canalization duct (4) of electrolyte with a device (50) realizing repetitive and alternative cycles of pressure decrease and of return to the initial pressure in the section of tube (40, 41) which connects said device to said canalization duct, said cycles causing the movement of the electrolyte being sucked and dropped respectively in said canalization duct.

4 Claims, 2 Drawing Sheets

50
41
10
10
40
4
4
4
6
5
7
1
3
2

METHOD AND APPARATUS TO OBTAIN THE AGITATION OF ELECTROLYTE INSIDE A LEAD-ACID STORAGE BATTERY

The invention concerns a method to realize the agitation of electrolyte inside a lead-acid storage battery.

It is a known fact that during the recharging process of the lead-acid storage battery fumes develop, especially hydrogen, which sometimes remain adherent to the plates, thus preventing the dissolution of the lead sulfate and the restoration of the balance in the battery. It is important then to activate a circulation or an agitation of electrolyte which can prevent fume bubbles from forming and accumulating during the charging process.

According to a known technique, in order to overcome such incoveniences, and also to accelerate the charging times, the agitation of electrolyte is achieved by blowing air inside the box containing the electrolyte during the charging process. In such a way, a mixing of electrolyte, with a consequent uniformity of its density at the various levels of the storage-battery is obtained. The purpose which the invention proposes is to obtain an agitation of electrolyte inside a lead-acid storage battery during the charging process wherein such an agitation occurs without blowing air or other gasses from the exterior inside the electrolyte.

The main purpose of the invention and others which will be better pointed out hereinafter, are achieved by the proposed method to obtain the agitation of electrolyte inside a lead-acid storage battery comprising at least one canalization duct of electrolyte which is immersed inside the storage battery wherein said method is characterized in that it consists in:

connecting said canalization duct of electrolyte with a device realizing repetitive and alternative cycles of pressure decrease and of return to the initial pressure in the section of tube which connects said device to said canalization duct, said cycles causing the movement of electrolyte by sucking and dropping it respectively, in said canalization duct.

Advantageously, during a recharging process one or more storage batteries are connected to the device of the pressure variation, these being equipped each with one canalization duct, for instance a vertical pipe which sticks out of the lid of the storage battery. With a device for the pressure variation during the suction phase of said device, the electrolyte is made to go up along the canalization duct while, when the pressure returns to its normal values, the electrolyte comes down back to its original level. In realizing this variation of pressure with repetitive cycles and with a certain frequency, the electrolyte contained inside the storage battery is constantly pushed upwards and dropping down.

The consequent agitation of electrolyte causes a uniformity of density of electrolyte at the various levels of the box of the storage battery and also a stripping action on the electrolyte plates with a consequent removal of possible hydrogen fume bubbles which form during the recharge. This action of movement of electrolyte causes a decrease of the charging time and also a better uniformity of the charge of the plates with a consequent extension of the life span of the storage battery.

Further scope of applicability of the present invention will become apparent from the detailed description given hereinafter. However, it should be understood that the detailed description and specific example, while indicating a preferred embodiment of the invention, are given by way of illustration only, since various changes and modifications within the spirit and scope of the invention will become apparent to those skilled in the art from this detailed description and from the drawings.

BRIEF DESCRIPTION OF THE INVENTION

DETAILED DESCRIPTION OF THE INVENTION

Figure 1:
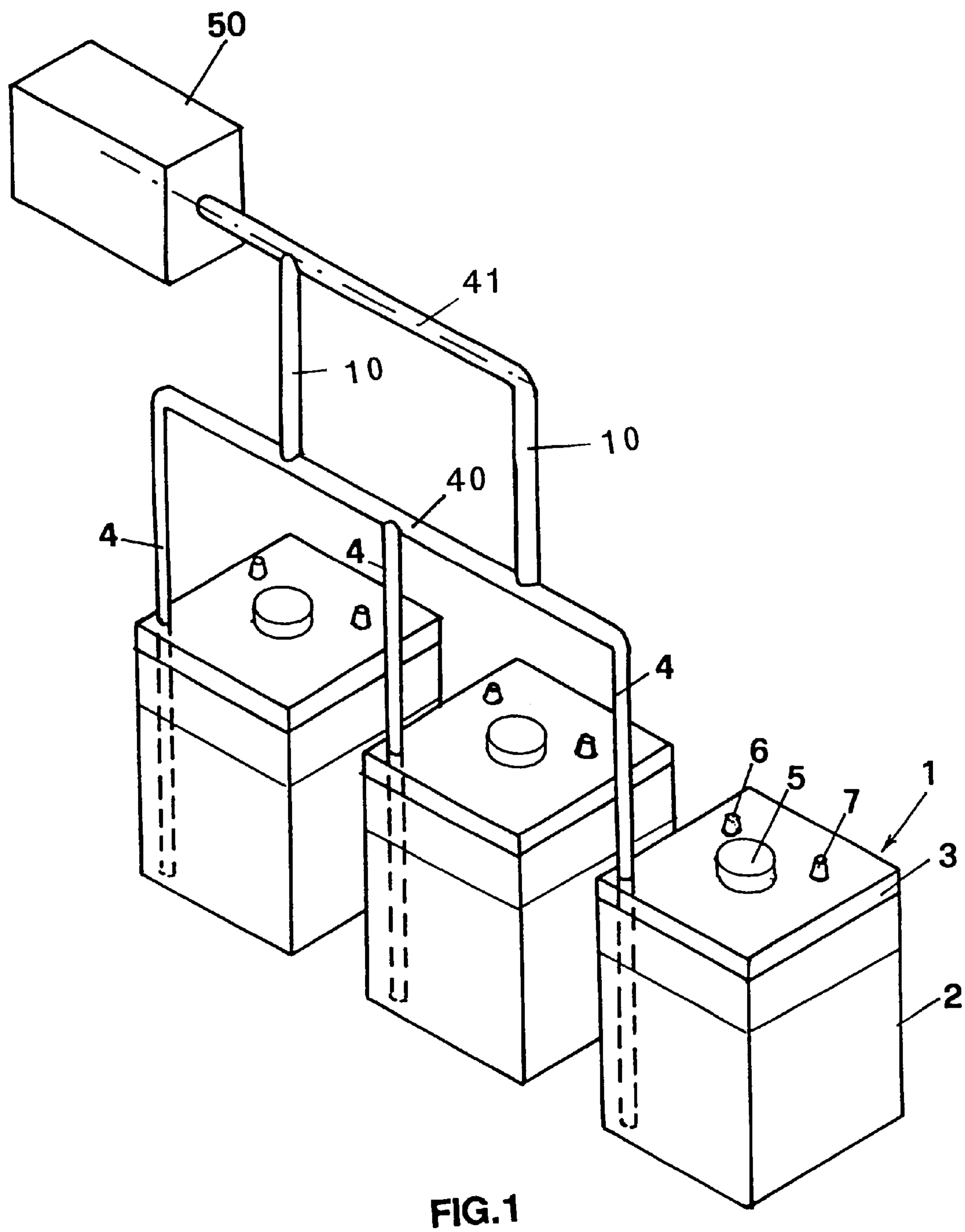
FIG. 1 shows in a prospective view three storage batteries connected with a device suited to realize the method of agitation of electrolyte according to the invention.

With reference to the mentioned Figures, it can be observed that each container, indicated as a whole with 1, presents a box 2 and a lid 3 sealed on box 2. Each storage battery 1 is also equipped with a canalization duct of electrolyte, indicated with 4. Each duct 4 has an inlet end 8 formed in an opening in the lid 3 and extending into the vessel 2 for receiving liquid therein. Each duct 4 also has a suction end 9 extending through the opening in the lid 3 to the outside of the vessel 2. Each storage battery also presents a topping up hole for the electrolyte provided with a seal-tight cap 5 besides the two poles 6 and 7. During the recharging phase of the storage batteries, several storage batteries are connected with one another, each in correspondence with the canalization ducts 4 by means of tubes 40 and 41 which are connected to the device 50 which realizes the alterative cycles of the pressure variation inside each container 1. Tubes 40 and 41 are connected by with a plurality of intermediate tubes 10. Each intermediate tube 10 has a first end 11 connected to the first tube 40 and a second end 12 connected to the second tube 41.

Figure 3:
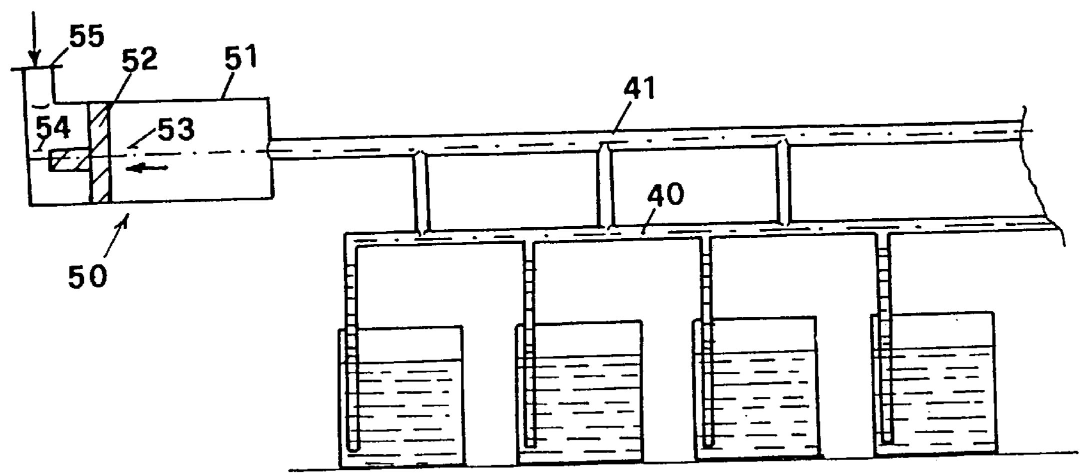
FIG. 3 shows the drawing of FIG. 2 during the phase of maximum decrease of the pressure inside the storage battery.
Figure 2:
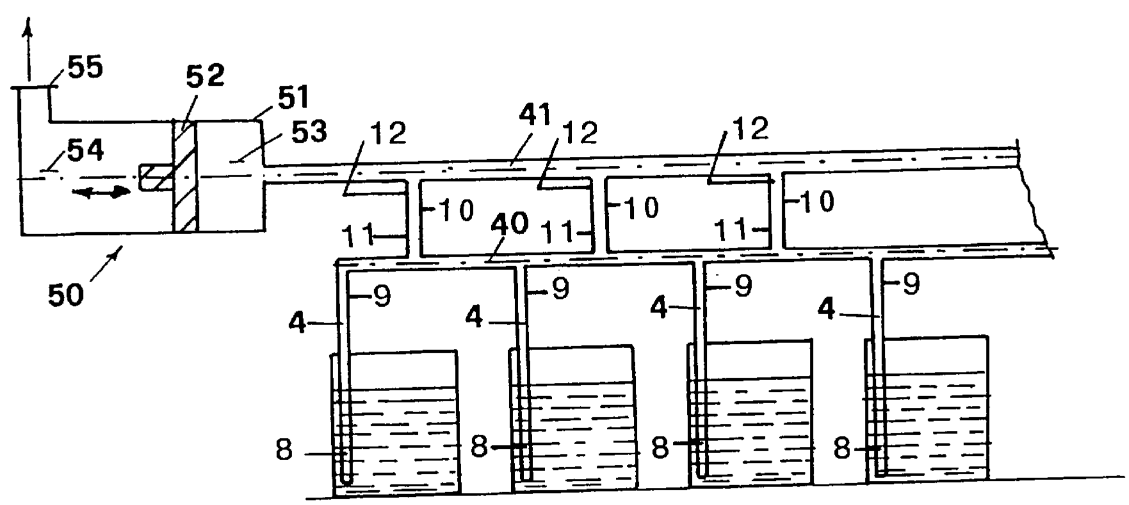
FIG. 2 shows in a cross-section an application sketch of the method according to the invention before the decreasing phase of the pressure inside the storage batteries.

As can be observed in the Figs. from 2 to 3, the device 50 consists of a cylinder 51 inside which a piston 52 slides alternatively, driven by known means not represented in the drawing. In correspondence with the head of the cylinder there is an opening connected to duct 41 and, therefore, to each canalization duct 4 of electrolyte. As can be observed in FIG. 3, once piston 52 has moved in the direction opposite to the entrance duct 41, the electrolyte will raise in the canalization ducts 4 in order to realize a variation in volume whose total value is equal to the variation in volume of the space 53 created by the stroke of piston 52. In the meantime, the air contained in the inner space 54 comes out of valve 55. Piston 52 then reverts its stroke, without uncovering the port of valve 55 in space 53, so that the intial pressure inside the containers 1 is restored and, therefore, the electrolyte drops down to its inital level, as can be observed in FIG. 2.

It is clear that by varying the frequency of the strokes of piston 52 it is possible to obtain a variation in the frequency of the ascent and descent of electrolyte and, therefore, of the degree of agitation of the electrolyte itself. Of course, the devices which realize repetitive and alternative cycles of the pressure decrease and the return to the initial pressure can differ from the one now described. However, an important fact is still present, that is in this way the electrolyte is agitated and, therefore, there is a mixing of the electrolyte itself, with a levelling in the electrolyte density and moreover, there will be a removal of possible fume bubbles which had remained adherent to the plates.

What is claimed is:

1. A method for agitating electrolyte inside a group of lead-acid storage batteries, comprising the steps of:

providing each of said batteries with a vessel for containing a selected liquid level, a lid with an opening for closing said vessel and having at least one canalisation duct for carrying electrolyte immersed inside the storage battery and emerging from the lid, each canalisation duct having an inlet end formed in the opening in the lid and extending below the liquid level for receiving liquid therein and each canalisation duct having a suction end extending through the opening outside the vessel, reciprocal means commonly coupled to the suction ends of the canalisation ducts for cyclically pressurizing and depressurizing the liquid in the canalisation ducts, a portion of each canalisation duct outside the lid of said storage battery is sized to receive an increased volume of the electrolyte during suction performed by said reciprocal means, a plurality of tubes having a first tube commonly connecting the suction ends of the canalisation ducts and a second tube connected to the reciprocal means, and a plurality of intermediate tubes interconnecting the first tube with the second tube;

connecting each of said canalisation ducts with the reciprocal means through the plurality of tubes and intermediate tubes for carrying out repetitive and alternating cycles of pressure decrease from an initial pressure and returning to the initial pressure in a portion of the tubes which connects said reciprocal means to said canalisation ducts, said cycles causing the movement of the electrolyte which is sucked and dropped respectively in said canalisation ducts.

2. A method for agitating electrolyte within a group of lead-acid storage batteries according to claim 1, further comprising the step of:

cyclically operating the reciprocating means in alternating suction and pressure cycles; said cycles, causing the movement of the electrolyte in the battery into and out of said canalisation ducts thereby agitating the electrolyte.

3. An apparatus for agitating electrolyte in a group of storage batteries, each battery in the form of a vessel for containing a selected liquid level and a lid having an opening for closing said vessel comprising:

a duct having an inlet end formed in the opening in the lid and extending below the liquid level for receiving liquid therein and said duct having a suction end extending through the opening outside the vessel;

reciprocal means commonly coupled to the suction ends of the ducts for cyclically pressurizing and depressurizing the liquid in the ducts;

a portion of each duct outside the lid of said storage battery is sized to receive an increased volume of the electrolyte during suction performed by said reciprocal means;

a plurality of tubes has a first tube commonly connecting the suction ends of the ducts;

the plurality of tubes has a second tube connected to the reciprocal means; and a plurality of intermediate tubes are connected to said first tube and said second tube.

4. The apparatus of claim 3 wherein each intermediate tube of said plurality of intermediate tubes, has a first end connected to the first tube and a second end connected to the second tube.

* * * * *